June 21, 1949.  A. D. COLTMAN  2,474,196
INSTRUMENT MOUNTING
Filed Oct. 17, 1945
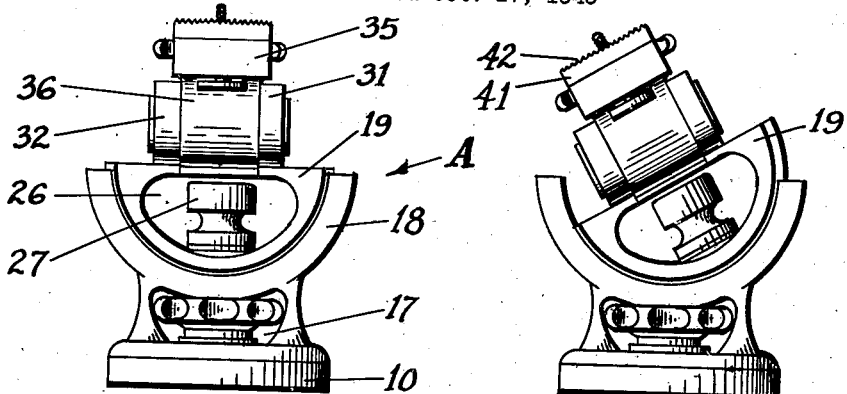
Fig. 1.  Fig. 2.
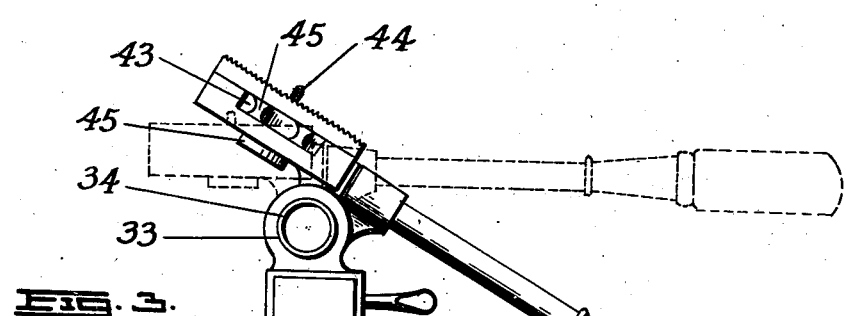
Fig. 3.
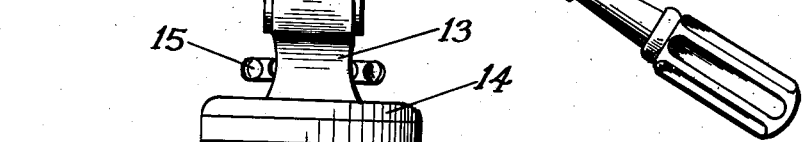
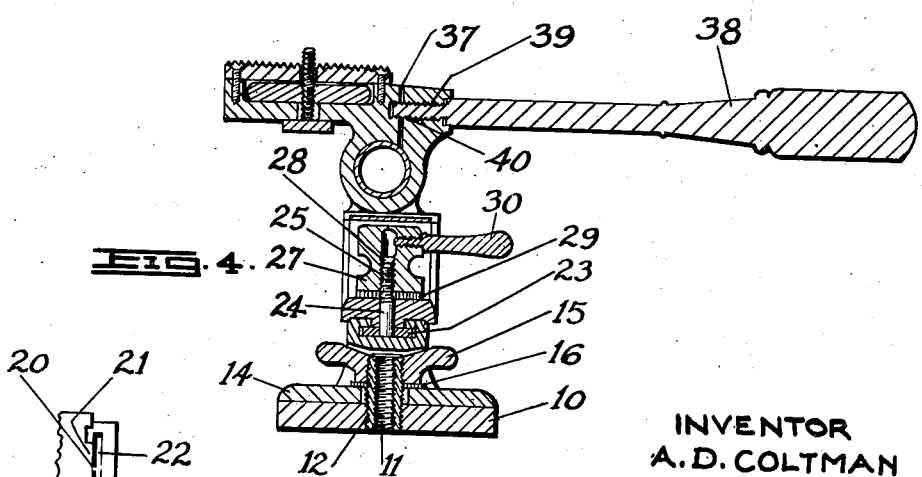
Fig. 4.
Fig. 5.
INVENTOR
A. D. COLTMAN
By:- Fetherstonhaugh & Co.
ATT'YS.

Patented June 21, 1949

2,474,196

UNITED STATES PATENT OFFICE 2,474,196

INSTRUMENT MOUNTING

Alfred Donald Coltman, Vancouver, British Columbia, Canada, assignor to Graflex, Inc., Rochester, N. Y., a corporation of Delaware Application October 17, 1945, Serial No. 622,732

14 Claims. (Cl. 248—183)

This invention relates to instrument mountings and in particular mountings for cameras, transits and the like.

It is an object of the present invention to provide a simple instrument mounting which may be adjusted to dispose the instrument at any predetermined angle to its normal horizontally disposed position: at an upwardly or downwardly directed incline to the normal horizontal plane, tilted sidewise at an angle to the normal horizontal plane, and/or swung to be disposed at a selected angle radially of the central vertical axis of the mounting.

A further object of the invention is to provide a device of this kind wherein the sidewise tilting of the instrument is effected while maintaining the instrument directly adjacent to the central vertical axis of the mounting.

A still further object of the invention is to provide a device of this kind wherein the adjusting and locking means in each instance is readily accessible and constitute simple elements.

A further object of the invention is to provide a device of this kind of compact design and which is capable of smooth operation.

With these and other objects in view the invention generally comprises a mounting having a fixed base plate designed to be secured on a tripod or the like, a pedestal rising therefrom and rotatably adjustable relatively thereto, including means for locking the pedestal in adjusted position relatively to the stationary base, the said pedestal including an arcuate guideway and a quadrant rotatable in said guideway, the quadrant carrying the instrument mounting element and including a means of adjusting the instrument mounting element to an incline to the transverse axis of the quadrant regardless as to its angular position, whereby the instrument may be disposed in any predetermined angular position.

The invention will be clearly understood by reference to the following detailed specification taken in conjunction with the accompanying drawings.

In the drawings:

Fig. 1 is a front elevation of the instrument mounting.

Fig. 2 is a similar view to Fig. 1 but showing one angular adjustment of the instrument mounting element relative to the mounting structure.

Fig. 3 is a side elevation of the instrument mounting showing the instrument mounting element disposed at an upward incline to the horizontal with normal horizontal position indicated by dotted lines.

Fig. 4 is a longitudinal section taken through the instrument mounting to illustrate various details of construction; and Fig. 5 is a fragmentary top plan view of part of the mounting at one side thereof to illustrate the nature of the guideway provided for tilting the instrument sidewise at an angle to the horizontal.

Referring to the drawings, A indicates the instrument mounting as a whole which includes a base plate 10 formed preferably with a central screw-threaded mounting bore 11, carried by the screw-threaded sleeve 12, through which the base 10 is rigidly secured on a tripod or other suitable support. The mounting includes a pedestal 13 formed with a flat base 14 which is designed slidably to bear on the top of the base plate 10 so that it can be rotated on the base plate to dispose the pedestal at any desired angle radially of the central vertical axis of the mounting A. The base 14 is centrally orificed rotatably to fit over the sleeve 12 and a locking member 15 is screw-threaded on the sleeve 12 and designed to be rotated thereon to clamp the base 14 rigidly on the base plate 10 when it has been rotated to the desired position to adjustment. Conversely, by releasing the locking member 15 the base 14 is left free to rotate relatively to the fixed base plate 10. A suitable washer of fibre or the like 16 may be included as part of the locking construction. Moreover, it will be noted that the locking member 15 is disposed within a recessed portion 17 of the pedestal 13 and is, therefore, readily accessible from both sides of the pedestal for convenient adjustment, the sleeve 12 being disposed concentric with the central vertical axis of the mounting A.

The pedestal 13 terminates in an arcuate holder 18 centered relatively to the central vertical axis of the mounting and designed adjustably to receive the quadrant 19, the arcuate periphery of which is formed with a guide rib 20 (Fig. 5) fitting within the guide slot 21 which opens into the arcuate guideway 22 of the holder 18. The guideway 22 is designed to receive the slider plate 23 which is carried rigidly on a suitable pin 24 passing upwardly through the central guide rib 20 of the quadrant 19. The pin 24 passes upwardly freely through the quadrant 19 and is screw-threaded at its upper end as at 25. The quadrant 19 is centrally recessed as at 26 and the screw-threaded portion of the pin 24 projects into its recess. It is engaged by a locking head 27 which is formed with a screw-threaded bore 28 for cooperative screw-threaded engagement with the pin 24. A suitable washer 29 is disposed between the base and the recess 26 and the locking head 27. An operating handle 30 is secured to the locking head 27 so that by swinging the handle to one side and causing the head to rise on the pin by reason of the screw-threaded connection therewith, locking pressure on the sliding plate is released and, therefore, the quadrant 19 may be tilted (such as shown in Fig. 2) in any desired position within the arc of the holder 18. Similarly it can be locked in the selected position merely by swinging the handle 30 towards the other side to cause a clamping of the plate 29.

From the upper portion of the quadrant 19 a pair of lugs 31 and 32 project in spaced apart relation, one on each side of the central vertical axis of the mounting. These lugs have the transverse circular openings 33 aligned with one another. The openings 33 are designed to receive the ends of a preferably hollow cylindrical shaft 34 which forms a direct mounting for the instrument holding element 35. This is provided with a central orificed lug or the like 36 designed to be rotatably carried by the shaft 34, the lug being integral with the holding element 35, the latter being split as at 37 in such a way as to intersect the central orifice of the lug and, therefore, form a means of clamping the lug with respect to the shaft 34. In this connection, the instrument mounting element 35 is provided with an operating handle 38 which has a screw-threaded shank 39 designed to enter into a screw-threaded bore 40 in the element 35 which extends on each side of the split 37. Therefore, by rotating the handle 38, the screw-threaded shank may be screwed into the bore 40 to a substantial extent, serving to pull the split portions towards each other and effect a clamping action on the shaft 34. Similarly, by rotating the handle 38 slightly to the left, the split portions are permitted to spread apart thus loosening the grip on the shaft. When loosened in this way, the handle may be operated to swing the instrument mounting element 35 to various inclines from the horizontal, such as illustrated in Fig. 3, and locked in the selected position as above described.

The instrument mounting element 35 includes a mounting plate 41 fastened thereto and which is preferably formed with an upper frictional surface 42, such as an knurled surface. Below the mounting plate, the element 35 is transversely recessed as at 43 and, centrally of this element and traversing the recess 43, is a mounting screw 44 provided with an enlarged head 45 for operating purposes. The screw 44 is designed to pass through an orifice in the mounting plate 41 and into the screw-threaded bore of a camera or other instrument formed with such a bore for mounting on a tripod. The instrument, therefore, is designed to bear upon the upper surface of the plate 41 and a locking element 45 is disposed within the recess 43 and in screw-threaded engagement with the screw 44. This locking element is designed to project from each end of the recess 43 beyond the edges of the mounting element 35. Therefore, by rotating the locking element 45 in one direction, the instrument can be securely locked in position on plate 41, whereas by reversing the locking element the instrument is loosened sufficiently to permit removal of the screw 44 to release it completely from its mounting.

The structure, as is apparent, presents a very compact unit which provides for the complete angular adjustment of the instrument which it may carry. For instance, in a very simple manner, by manipulation of the locking member 15 the pedestal base 14 may be loosened and rotated relatively to the fixed base 10. This will permit adjusting of the instrument to any angle radially of the central longitudinal axis of the unit. Moreover, by manipulation of the locking head 27 to release the plate 23 from locked position, the quadrant 19 may be rotated sidewise to dispose the mounting plate 35 at selected inclines to the horizontal. Finally, by releasing the handle 38 so as to spread apart the split portions 37 of the mounting element 35, the latter may be rotated forewards or backwards on the shaft 34 to dispose the instrument at any selected incline to the horizontal.

The device is very quick to manipulate since the locking members 15 and 27 are readily accessible by reason of the substantial rests provided and the character of the locking members protruding therefrom, whereas the rotational manipulation of the handle 38 in one direction or another to release or lock the mounting element 35 relatively to the shaft 34 constitutes a very simple and readily performed operation. As a result, therefore, I provide a simple compact mounting for instruments which will permit the angular adjustment of the instrument relative to the horizontal and the vertical as well as radially to the central longitudinal axis. This not only can be achieved very quickly, but it is apparent that the instrument may be quickly and positively locked in any set position.

By reason of the simple nature of the various elements making up the unit and the compact nature of the unit, it is obvious that it lends itself to precision manufacture and mass production so that an accurate unit may be produced economically.

What I claim as my invention is:

1. An instrument mounting unit comprising a base plate, a pedestal rising therefrom and terminating in an arcuate holder, the concavity whereof faces upward, an instrument mounting element having a cooperating, downwardly facing, arcuate contour operatively connected to said arcuate holder, the latter being centered with respect to the vertical axis of the pedestal, the said instrument holding element being arcuately movable in the said upwardly facing, arcuate holder to adjust said holder to varied inclined positions relative to the horizontal, the said instrument-holding element having extending upwardly therefrom at least one bearing projection and a shaft received in the latter, said instrument mounting unit having an instrument holding element received upon said shaft and adapted to be turned angularly thereon to change the position of the instrument, the instrument carried by the instrument mounting unit being disposed substantially adjacent to the central vertical axis of the unit when said mounting element is in one of its inclined adjusted positions, and means for locking said instrument holding element in a selected position of adjustment.

2. An instrument mounting unit comprising a substantially horizontal base plate, an upwardly extending pedestal rotatably carried on said base plate and rotatable in a substantially horizontal plane to selected positions of adjustment relatively thereto, means including a threaded locking member for locking said pedestal rigidly with said base plate in selected adjusted position, said upwardly extending pedestal terminating in an arcuate holder, the concavity whereof faces upwardly, instrument mounting means including an element having a downwardly facing arcuate contour fitting with the upwardly facing, arcuate contour of the holder and rotatably adjustably thereon in a plane at right angles to the rotational plane of adjustment of the pedestal, said mounting means being rotatable sidewise to inclined positions relatively to the horizontal and being adapted to dispose an instrument carried thereby adjacent to the central vertical axis of the unit when adjusted to said inclined positions, adjusting means in connection with the instrument mounting means for adjusting the instrument mounting forward or backward at an incline to the axial plane thereof, an operating handle connected with said mounting means and operable to move said instrument to selected positions of adjustment radially of the central vertical axis, inclined to the horizontal in planes at right angles to one another, and locking means for retaining the instrument mounting means in any of its several positions of angular adjustment.

3. An instrument mounting unit comprising a base plate, a pedestal rising therefrom and terminating in an arcuate holder, an instrument mounting element having a cooperating arcuate contour operatively connected to said arcuate holder, the latter being centered with respect to the vertical axis of the pedestal, the said instrument-holding element being arcuately movable in the arcuate holder to adjust said holder to varied inclined positions relative to the horizontal, the instrument carried thereby being disposed substantially adjacent to the central vertical axis of the unit when said mounting element is in one of its inclined adjusted positions, and means for locking said instrument-holding element in a selected position of adjustment, the said arcuate instrument holder being formed with an arcuate channel having a slot communicating therewith throughout the upper arcuate surface thereof, the instrument holder including a peripheral rib throughout its arcuate surface designed to enter into the slot of the holder, and a securing element to secure the instrument mounting element rigidly with the instrument holder in selected positions of adjustment, including a clamping element disposed in the channel and overlapping the edges of said slot, a pin connected therewith and passing through said slot and the instrument mounting element, and a locking head in connection with the pin for locking and releasing the clamping element in and from frictional engagement with interior walls of the channel.

4. An instrument mounting unit comprising a base plate, a pedestal rising therefrom and terminating in an arcuate holder, the concavity whereof faces upward, an instrument mounting element having a cooperating downwardly-facing arcuate contour operatively connected to said arcuate holder, the latter being centered with respect to the vertical axis of the pedestal, the said instrument holding element being arcuately movable in the said upwardly facing arcuate holder to adjust said holder to varied inclined positions relative to the horizontal, the instrument carried thereby being disposed substantially adjacent to the central vertical axis of the unit when said mounting element is in one of its inclined adjusted positions, and means for locking said instrument holding element in a selected position of adjustment, the said arcuate holder being formed with an arcuate channel having a slot communicating therewith throughout the upper arcuate surface thereof, the instrument holder including a peripheral rib throughout its arcuate surface designed to enter into the slot of the holder, and a securing element to secure the instrument mounting element rigidly with the instrument holder in selected positions of adjustment, including a clamping element disposed in the channel, a pin connected therewith and passing through said slot and the instrument mounting element, and a locking head in connection with the pin for locking and releasing the clamping element in and from frictional engagement with interior walls of the channel, said instrument mounting element including a pair of lugs projecting upwardly therefrom in spaced apart relation, said lugs being disposed on opposite sides of the central vertical axis of the unit, a transverse shaft carried by said lugs and an instrument mounting swingably carried on said transverse shaft designed to swing relatively thereto in a plane at right angles to the plane of movement of the instrument mounting element to dispose the instrument mounting and the instrument carried thereby at an incline at right angles to the plane of inclined adjustment of the instrument mounting element, and means for locking said instrument mounting in adjusted position.

5. An instrument mounting unit comprising a base plate, a pedestal rising therefrom and terminating in an arcuate holder, an instrument mounting element having a cooperating arcuate contour operatively connected to said arcuate holder and rotatable to dispose said mounting element in inclined positions, means for locking said instrument mounting element rigidly with the arcuate holder in selected positions of adjustment including a clamping means and a locking head for locking and releasing the clamping means, said instrument mounting element being centrally recessed, said locking head being disposed within the central recess and being accessible from opposite sides of the instrument mounting element, said arcuate holder being centered with respect to the vertical axis of the pedestal, the instrument carried by said instrument mounting element being disposed substantially adjacent to the central vertical axis of the unit when said mounting element is in one of its inclined adjusted positions.

6. An instrument mounting unit comprising a base plate, a pedestal rotatably carried on said base plate and rotatable to selected positions of adjustment relatively thereto, means for locking said pedestal rigidly with said base plate in selected adjusted position, said pedestal terminating in an arcuate holder, an instrument mounting element having a cooperating arcuate contour operatively connected to said arcuate holder and rotatable to dispose said mounting element in inclined positions, means for locking said instrument mounting element rigidly with the arcuate holder in selected positions of adjustment including a clamping means and a locking head for locking and releasing the clamping means, said instrument mounting element being centrally recessed, said locking head being disposed within the central recess and being accessible from opposite sides of the instrument mounting element, said arcuate holder being centered with respect to the vertical axis of the pedestal, the instrument carried by said instrument mounting element being disposed substantially adjacent to the central vertical axis of the unit when said mounting element is in one of its inclined adjusted positions, said pedestal being centrally recessed, said locking means for the pedestal being disposed within the recess of the pedestal and accessible from opposite sides thereof.

7. An instrument mounting unit as claimed in claim 6 in which the mounting element having an operating arcuate contour has its arcuate face downwardly directed and the arcuate holder has its concavity facing upward, and wherein said mounting element has a flat upper face and having upwardly extending therefrom a split-fitting having a transverse orifice adapted to receive a transversely extending shaft, said shaft supported in said split-fitting, and a member angularly adjustable about said shaft, together with means to lock said member in adjusted position about said shaft.

8. An instrument mounting-unit adapted to be received on a tripod or like support and adjustable in one plane with respect thereto and also having two distinct other adjustments about two different axes at an angle to each other and each at an angle to said first mentioned adjustment, said mounting-unit for the foregoing purpose comprising a base receivable upon a base plate of the tripod or like support and adjustable in a flat plane on such base plate, said mounting-unit also having an arcuate, member-receiving holder above said base plate, a quadrant-like member received in said arcuate holder so as to be capable of being turned upon its axis through a wide angle in said arcuate holder, with means pertaining only to said quadrant-like member for locking said quadrant-like member at any adjusted position on its axis in said arcuate member, said mounting-unit having extending from said quadrant-like member at least one bearing projection and a shaft receivable in the latter, said mounting-unit having an instrument-holding element receivable upon said shaft so as to be turned angularly thereon, and means distinct from said locking means to secure said instrument-holding element in any adjusted position on said shaft.

9. An instrument mounting-unit in accordance with claim 8, but wherein the arcuate member-receiving holder has a concaved upper face receiving the quadrant-like member, the latter having a convexed lower face received upon said concaved upper face of said arcuate holder, said quadrant-like member having a substantially flat upper face, shaft-supporting means upwardly extending from said flat face, a shaft received in said supporting means, an instrument-holding element rotatably supported upon said shaft and means to secure said holding element in any desired position of rotative adjustment upon said shaft.

10. A mechanical structure for supporting an instrument, said structure having an instrument-supporting member rotatably adjustable about a vertical axis, locking means for locking said instrument-supporting member about said vertical axis only, horizontal adjustment means for rotating said instrument-supporting member about a horizontal axis, locking means for locking said instrument-supporting member about said horizontal axis only, a second horizontal adjusting means for said instrument-supporting member, having a horizontal axis displaced by substantially ninety degrees from the axis of the aforesaid horizontal adjusting means, and locking means for locking said instrument-supporting member about said second horizontal axis only, whereby any one of said adjustments may be made by the locking means therefor, without disturbing either of the other two adjustments.

11. A mechanical structure in accordance with claim 10, but wherein there is provided at the lower end thereof a base receivable upon a tripod or like support and adjustable about said vertical axis on said tripod, to constitute said first mentioned adjustment, said two horizontal adjustment means being located above the said means for adjusting said instrument-supporting member about a vertical axis.

12. A mechanical structure in accordance with claim 10, but wherein one of said horizontal adjustment means includes an arcuate member-receiving holder and a quadrant-like member received upon said arcuate holder, and wherein the other of said horizontal adjustment means includes a horizontally supported shaft and a member rotatably adjustable about said shaft and adapted to have the instrument-holding element secured thereto.

13. A mechanical structure for supporting an instrument, said structure having an instrument-supporting member rotatably adjustable about a vertical axis, locking means for locking said instrument-supporting member about said vertical axis only, horizontal adjustment means for rotating said instrument-supporting member about a horizontal axis, locking means for locking said instrument-supporting member about said horizontal axis only, a second horizontal adjusting means for said instrument-supporting member, having a horizontal axis displaced through a substantially horizontal arc from the axis of the aforesaid horizontal adjusting means, and locking means for locking said instrument-supporting member about said second horizontal axis only, whereby any one of said adjustments may be made by the locking means therefor, without disturbing either of the other two adjustments.

14. A mounting-unit for cameras and other instruments adapted to be received upon a tripod or like support and bodily adjustable in a substantially horizontal plane with respect to the top supporting surface of said tripod, the instrument-receiving portion of said mounting-unit being also independently adjustable about each of two different horizontal axes that are at an angle to each other, said mounting unit having supports for said two axes relatively close to the supported camera or other instrument.

ALFRED DONALD COLTMAN.

REFERENCES CITED

The following references are of record in the file of this patent:

UNITED STATES PATENTS

| Number | Name | Date |
|---|---|---|
| 258,558 | Cook | May 30, 1882 |
| 508,319 | Ivarson | Nov. 7, 1893 |
| 696,167 | Forester | Mar. 25, 1902 |
| 718,445 | Fliehmann | Jan. 13, 1903 |
| 875,034 | Wright | Dec. 31, 1907 |
| 1,794,726 | Mitchell | Mar. 3, 1931 |
| 1,854,951 | Neuwirth | Apr. 19, 1932 |
| 2,244,089 | Swartz | June 3, 1941 |
| 2,261,426 | Willcox | Nov. 4, 1941 |
| 2,318,910 | Zucker | May 11, 1943 |